United States Patent [19]

Goettsch et al.

[11] Patent Number: 5,059,650

[45] Date of Patent: Oct. 22, 1991

[54] PREPARATION OF FLAMEPROOFED POLYSTYRENE

[75] Inventors: Manfred Goettsch, Mutterstadt; Hubert Kindler, Ludwigshafen; Norbert Moedersheim, Frankenthal; Guenther Rudolph, Beindersheim, all of Fed. Rep. of Germany

[73] Assignee: BASF Aktiengesellschaft, Ludwigshafen, Fed. Rep. of Germany

[21] Appl. No.: 241,806

[22] Filed: Sep. 7, 1988

Related U.S. Application Data

[63] Continuation of Ser. No. 895,663, Aug. 11, 1986, abandoned.

[30] Foreign Application Priority Data

Aug. 22, 1985 [DE] Fed. Rep. of Germany ....... 3529982

[51] Int. Cl.$^5$ .............................................. C08K 5/03
[52] U.S. Cl. ............................... 524/412; 264/211.21; 264/211.23; 524/410; 524/411; 524/467
[58] Field of Search ............... 524/467, 410, 411, 412; 264/211.21, 211.23

[56] References Cited

U.S. PATENT DOCUMENTS

| | | | |
|---|---|---|---|
| 3,004,935 | 10/1961 | Raley et al. | 524/577 |
| 3,093,599 | 6/1963 | Mueller-Tamm et al. | 525/210 |
| 3,275,731 | 9/1966 | Kosinsky | 264/211.23 |
| 3,301,813 | 1/1967 | Dahms et al. | 521/54 |
| 3,577,494 | 5/1971 | Chisolm et al. | 264/211.21 |
| 3,677,942 | 7/1972 | Feiner et al. | 524/341 |
| 4,069,288 | 1/1978 | Barkhuff, Jr. | 523/307 |
| 4,089,912 | 5/1978 | Levek et al. | 524/371 |
| 4,130,605 | 12/1978 | Barkhuff, Jr. | 524/371 |
| 4,150,066 | 4/1979 | Kudo et al. | 524/341 |
| 4,530,880 | 7/1985 | Taniuchi et al. | 524/375 |
| 4,532,287 | 7/1985 | Bill et al. | 524/375 |
| 4,618,636 | 10/1986 | Muench et al. | 524/176 |

FOREIGN PATENT DOCUMENTS

| | | |
|---|---|---|
| 0092776 | 11/1983 | European Pat. Off. . |
| 1444440 | 7/1976 | United Kingdom . |
| 1453692 | 10/1976 | United Kingdom . |

*Primary Examiner*—Veronica P. Hoke
*Attorney, Agent, or Firm*—Keil & Weinkauf

[57] ABSTRACT

A process for the preparation of flameproofed polystyrene which
  a) contains halohydrocarbons as flameproofing agents and which additionally contains one or more agents from the group of
  b) synergists for the flameproofing agent,
  c) stabilizers,
  d) antioxidants and
  e) additives by mixing polystyrene with one or more of agents a) to e) in a plurality of stages, wherein in a first stage the flameproofing agent a) and the entire amount or a proportion of the stabilizers c) are premixed at up to 100° C. in a mixing apparatus and this premix is then, in a second stage, mixed with the other agents, in a continuously operated single-screw or twin-screw extruder or a kneader of conventional construction, in such a manner that, viewed in the conveying direction of the extruder, first the premix, with or without other agents, is continuously fed in and thereafter, in the further mixing zones, a melt of a polystyrene resin, which has been substantially freed from monomers and solvents and is at from 200° to 250° C., with or without other agents, is directly introduced into the above product stream, and, using methods known per se, the flameproofed polystyrene is discharged from the extruder and isolated as granules.

3 Claims, No Drawings

PREPARATION OF FLAMEPROOFED POLYSTYRENE

This application is a continuation of application Ser. No. 895,663, filed on Aug. 11, 1986, now abandoned.

The present invention relates to a process for the preparation of flameproofed polystyrene which
a) contains halohydrocarbons as flameproofing agents and which additionally contains one or more agents from the group of
b) synergists for the flameproofing agent,
c) stabilizers,
d) antioxidants and
e) additives by mixing polystyrene with one or more of agents a) to e) in a plurality of stages.

The prior art includes:
(1) British Patent 1,444,440
(2) British Patent 1,453,692
(3) U.S. Pat. No. 3,093,599
(4) U.S. Pat. No. 4,130,605
(5) U.S. Pat. No. 4,069,288
(6) British Patent 92,776 (European)
(7) U.S. Pat. No. 3,301,813
(8) U.S. Pat. No. 4,150,066.

References (1) to (8) describe flameproofed polystyrene resins and processes for their preparation (cf., in particular, (2), column 2, lines 83 to 92, as well as the Examples, and (5), claim).

Self-extinguishing molding materials based on styrene polymers contain, in addition to the polymer, a number of additives, namely flameproofing agents and one or, most commonly, several stabilizers, with or without synergists and other assistants.

In preparing the molding materials, the additives may be added to the monomer at the time of preparation of the styrene polymers. They can also be added subsequently to the styrene polymer by, for example, mixing them, as a powder, with polystyrene granules. A preferred industrial method of preparation of self-extinguishing molding materials comprises homogeneously incorporating the additives into the styrene polymer by melting the polymer in an extruder or kneader and at the same time mixing the additives into the melt. This melt is then regranulated [cf. also (1), (2) and (5)].

It is known that self-extinguishing molding materials based on styrene polymers tend to decompose and discolor at an elevated temperature. Further, molding materials are known which, as a result of suitable stabilizer mixtures having been added, show no discoloration at conventional processing temperatures. However, even with these stabilized molding materials care must be taken not to exceed the permissible temperatures during their preparation and processing.

A disadvantage of the abovementioned preferred method of preparation of self-extinguishing molding materials is that in this method the occurrence of high temperatures, even if only briefly or locally, must be scrupulously avoided. Even with stabilized products which withstand one hour's storage of the granules at 240° C. without showing discoloration, it is necessary to melt and homogenize the mixture in the extruder at temperatures as low as 170°–190° C., cf. (1). This low material temperature is due to the fact that, as is known, in extruders the action of the high shearing force zones produces localized higher temperatures than the average material temperature. A further disadvantage is that the method requires an additional production stage employing expensive extruders or kneaders which have high energy consumption and demand much maintenance.

The styrene polymers required for the process described in (1), (2) or (5) are mostly produced in continuous processes in which the product is obtained in the form of a hot melt. This melt is discharged through dies, cooled and granulated. Extruders, in which assistants such as mineral oil, colorants and the like are added to the melt, are frequently interposed upstream of the discharge dies.

It is an object of the present invention to dispense with remelting of the styrene polymer, and reextrusion and granulation, in the preparation of selfextinguishing molding materials, thereby achieving substantial saving in investment, operating personnel, energy and maintenance work.

We have found that this object is achieved if the additives are mixed with the polymer melt, coming from the polymerization, in the discharge extruder of the polymerization plant. Because of the high temperature of the melt and the local superheating in the extruder it was to have been expected that considerable decomposition and discoloration of the product would occur in such a method; experiments showed this fear to be justified. However, the object of the invention is achieved if the process is conducted in accordance with claim 1.

Accordingly, the invention relates to a process for the preparation of flameproofed polystyrene, which
a) contains halohydrocarbons as flameproofing agents and which additionally contains one or more agents from the group of
b) synergists for the flameproofing agent,
c) stabilizers,
d) antioxidants and
e) additives other than (b), (c) or (d)

by mixing polystyrene with one or more of agents a) to e) in a plurality of stages, wherein in a first stage the flameproofing agent a) and the entire amount or a proportion of the stabilizers c) are premixed at up to 100° C. in a mixing apparatus and this premix is then, in a second stage, mixed with the other agents, in a continuously operated single-screw or twin-screw extruder or a kneader of conventional construction, in such a manner that, viewed in the conveying direction of the extruder, first the premix, with or without other agents, is continuously fed in and thereafter, in the further mixing zones, a melt of a polystyrene resin, which has been substantially freed from monomers and solvents and is at from 200° to 250° C., with or without other agents, is directly introduced into the above product stream, and, using methods known per se, the flameproofed polystyrene is discharged from the extruder and isolated as granules.

Accordingly, the object of the invention is to avoid discoloration and decomposition upon mixing a hot polystyrene melt with flameproofing agents, by premixing the flameproofing agents and stabilizers at up to 100° C., preferably at room temperature, then mixing this premix with the polystyrene melt, coming from a polymerization plant, in an extruder or kneader and, using methods known per se, extruding this mixture through a die plate and granulating it.

The process according to the invention and the means required for its performance are described in more detail below.

The preparation of styrene resins and the working up of the product after polymerization are known.

For the purposes of the invention, the term polystyrene also includes the high-impact polystyrenes in which the polymerization of styrene is carried out in the presence of from 2 to 30% by weight of a diene rubber or of block rubbers, of type AB or ABA or other types (A=styrene, B=diene), produced by anionic polymerization, or mixtures of the said rubbers. Moreover, the polystyrene may contain up to 40% by weight, preferably from 5 to 25% by weight, of comonomers, such as acrylonitrile, α-methylstyrene or methyl methacrylate.

Suitable flameproofing agents a) are halohydrocarbons such as chloroparaffins, in particular bromohydrocarbons such as nonabromodiphenyl or hexabromocyclododecane (HBCD). The use of the latter, in amounts of from 0.5 to 7% by weight, based on the ready-to-use molding material, is particularly preferred.

The synergists b) for the flameproofing agents are conventional metal oxides, of which $Sb_2O_3$ may be mentioned particularly. They are only used where appropriate, for particular versions of material. For example, a synergist is not employed when using HBCD.

The stabilizers c) employed are, in particular, organic phosphites, or, where appropriate, alkanepolyols or oligomers of dialkylbenzenes, e.g. dicumyl, as described in (1).

A preferred alkanepolyol is, for example, pentaerythritol, and a preferred phosphite is, for example, trisnonylphenyl phosphite. The ultraviolet stabilizers described in (1) can also be employed conjointly with the thermal stabilizers. The amounts of stabilizers used are from 0.03 to 3% by weight, based on the molding material.

In addition, antioxidants d), such as sterically hindered phenols may be used, in the amounts known to a man skilled in the art, cf. (2).

As additives e) there may be used processing assistants known per se, eg. lubricants and mold release agents, as well as pigments, plasticizers, antistatic agents, ultraviolet stabilizers, blowing agents, fillers and reinforcing rubbers, where these are not already part of a high-impact polystyrene. As a further agent f) there may be mentioned nonmolten polystyrene (granules), which is used in particular to prevent exudation from the extruder used in the second process stage. This nonmolten polystyrene may be of the high-impact type and may be used, inter alia, to adjust the mechanical properties (impact strength etc.) of the end product. It may be introduced into the extruder immediately prior to the premix or together with the latter or shortly thereafter.

The process is explained in more detail below:

In the first mixing apparatus (1st stage of the process), the entire amount of the stabilizers c), or only a proportion thereof, may be added to the flameproofing agent. Moreover, all or part of the other agents b), d) and e) required by the formulation of the self-extinguishing molding materials may be added in this stage. In general, the materials are introduced into the mixing apparatus at room temperature. The temperature may rise to about 100° C. due to frictional heat. The premixing may be carried out in batchwise or continuous mixing apparatus, for example in stirred kettles, drum mixers, mixing tubes, mechanical high-intensity mixers, kneaders or extruders. Depending on the nature and amount of the components, the mixture of the said agents may have a liquid, pasty, pulverulent or granular consistency.

In a preferred embodiment of the process according to the invention the flameproofing agents a), in particular HBCD, and the stabilizers c) are mixed immediately prior to being added to the polymer melt, and are fed continuously, without lengthy intermediate storage, to the mixing apparatus in which they are combined with the melt. However, the premix can also be prepared separately, and be stored as an intermediate stage.

The mixing of the mixture of flameproofing agent and stabilizer with the hot polymer melt is carried out in conventional mixing apparatus, preferably in mechanically agitated high-intensity mixers such as extruders or kneaders. Suitable extruders include both single-screw and especially twin-screw extruders.

In the preferred embodiment, a twin-screw extruder is used for mixing the premix with the polymer melt. In a highly preferred embodiment, granular styrene polymer is additionally fed in at the drive end of the extruder, in general in an amount of 3-50%, preferably 3-25%, more especially 5-15%, based on the total amount of molding material, and is melted in the adjoining downstream section of the extruder. The flameproofing agent and the stabilizers are added at the same point or, if desired, at a few sub-units' distance therefrom. In a further section of the extruder, namely the additional mixing zones, the hot polystyrene melt is then fed in. This melt is in general at from 200° to 250° C. Further materials, for example lubricants, e.g. mineral oil, can be fed in with the melt or at this point or other points of the extruder.

The temperature profile along the extruder is regulated by external heating and/or cooling and is adapted to keep the temperature as low as possible without excessively high viscosity causing very high local shearing forces and hence hot spots.

The molten product is discharged from the extruder in a manner known per se, preferably through a die head having a plurality of orifices arranged in one or more rows or circles. The die head must be designed so as to ensure that there are no zones of increased residence time of the product. Furthermore, the heating of the die head must be such as not to cause increased temperatures even locally.

The product strands issuing from the die head are passed, in conventional manner, through a water bath and are subsequently converted to cylindrical granules in a cutter. However, other known granulating apparatus, such as an underwater cutter or face cutter may also be employed in the novel process.

The parameters described in the present application were determined as follows:
1. The tensile strength and elongation at break were determined according to DIN 53 455.
2. The modulus of elasticity was determined according to DIN 53 477.
3. The impact strength was determined according to DIN 53 453.
4. The Vicat temperature was determined according to DIN 53 460 VST/B 50.
5. The melt index was determined according to DIN 53 735 MFI 200/5.0.
6. The flameproofing test was carried out in a vertical burning test according to the Underwriters' Laboratories specification and the products were classified under one of fire classes UL 94 V0, V1, V2 or 5V.
7. The intrinsic color was assessed by comparison with commercial products.

I. The materials described below were employed to carry out the experiments described in the Examples, and the comparative experiments:

The polystyrene resin was the melt of a product having the following properties:

| Properties at 23° C. | | |
|---|---|---|
| Tensile strength | N/mm² | 28 |
| Modulus of elasticity | N/mm² | 2000 |
| Elongation at break | % | 40 |
| Impact strength | kJ/m² | No fracture |
| Vicat temperature | °C. | 90 |
| Melt index | g/10 min | 4 |

II. Flameproofing agent R was a chloroparaffin containing 70% of chlorine, flameproofing agent S was nonabromodiphenyl and flameproofing agent T was hexabromocyclododecane, all of commercial grade.

III. The synergist employed was antimony trioxide.

IV. Tris-nonylphenyl phosphite was employed as stabilizer D, pentaerythritol as stabilizer E and polypara-diisopropylbenzene, with a degree of polymerization of 6, as stabilizer F.

V. 2,6-Di-tert.-butyl-p-cresol was employed as antioxidant.

VI. A commercial mineral oil was used as additive A, a polystyrene of melt index 5 g/10 min as additive B and a reinforcing rubber, namely a linear S/B/S three-block copolymer (®Cariflex TR 1101) as additive C.

EXAMPLES 1 TO 4 AND COMPARATIVE EXPERIMENTS 5 TO 8

All quantities are by weight.

All the Examples and comparative experiments described were carried out on a twin-screw extruder of 30 D screw length, provided with a plurality of feed orifices.

Accordingly, it was possible to introduce the materials employed at 2 D, 14 D, 20 D and/or 24 D, the numbering being from the drive end of the screw toward the discharge orifice.

A proportion of the materials was premixed batchwise in a mixing apparatus having a high-intensity mixer, and the premix was continuously fed into the extruder by means of a metering apparatus.

The Examples, comparative experiments and results are described below.

The following materials were employed:

TABLE 1
COMPOSITION OF THE MOLDING MATERIAL
(parts by weight)

| Examples | 1 | 2 | 3 | 4 |
|---|---|---|---|---|
| Premix: | | | | |
| Flameproofing agent R | 12 | — | — | — |
| Flameproofing agent S | — | 12 | — | — |
| Flameproofing agent T | — | — | 3.4 | 3 |
| Synergist | 6 | 4 | — | — |
| Stabilizer D | 0.6 | 0.5 | 1 | 1 |
| Stabilizer E | 0.2 | — | 0.2 | 0.2 |
| Stabilizer F | — | — | 0.2 | 0.2 |
| Additive A | — | — | 3 | — |
| Antioxidant | 0.2 | 0.2 | 0.2 | — |
| Polystyrene melt | 73 | 80 | 67 | 50 |
| Additive A | — | — | 3.0 | 0.8 |
| Additive B | 4.0 | 3.3 | 22 | 44.6 |
| Additive C | 4.0 | — | — | — |
| Antioxidant | | | | 0.2 |

| Comparative experiment | 5 | 6 | 7 | 8 |
|---|---|---|---|---|
| Flameproofing agent R | 12 | — | — | — |

TABLE 1-continued
COMPOSITION OF THE MOLDING MATERIAL
(parts by weight)

| Flameproofing agent S | — | 12 | — | — |
|---|---|---|---|---|
| Flameproofing agent T | — | — | 3.4 | 3.0 |
| Synergist | 6 | 4 | — | — |
| Stabilizer D | 0.6 | 0.5 | 1 | 1 |
| Stabilizer E | 0.2 | — | 0.2 | 0.2 |
| Stabilizer F | — | — | 0.2 | 0.2 |
| Antioxidant | 0.2 | 0.2 | 0.2 | 0.2 |
| Polystyrene melt | 73 | 80 | 67 | 50 |
| Additive A | — | — | 6 | 0.8 |
| Additive B | 4 | 3.3 | 22 | 44.6 |
| Additive C | 4 | — | — | — |

These materials were introduced through the following feed orifices of the twin-screw extruder:

TABLE 2

| Example | 1 | 2 | 3 | 4 |
|---|---|---|---|---|
| Premix | 2 D | 2 D | 2 D | 2 D |
| Polystyrene melt | 14 D | 14 D | 14 D | 14 D |
| Antioxidant | — | — | — | 24 D |
| Additive A | — | — | 20 D | 20 D |
| Additive B | 2 D | 2 D | 2 D | 2 D |
| Additive C | 2 D | — | — | — |

| Comparative experiments | 5 | 6 | 7 | 8 |
|---|---|---|---|---|
| Flameproofing agent | 20 D | 20 D | 2 D | 24 D |
| Synergist | 20 D | 2 D | — | — |
| Stabilizer | 2 D | 2 D | 2 D | 2 D |
| Polystyrene melt | 14 D | 14 D | 14 D | 14 D |
| Antioxidant | 2 D | 2 D | 2 D | 24 D |
| Additive A | — | — | 20 D | 20 D |
| Additive B | 2 D | 2 D | 2 D | 2 D |
| Additive C | 2 D | — | — | — |

The end products had the following properties:

TABLE 3

| | Product according to Example | | | |
|---|---|---|---|---|
| Properties at 23° C. | 1 | 2 | 3 | 4 |
| Tensile strength N/mm² | 30 | 30 | 24 | 34 |
| Modulus of elasticity N/mm² | 1900 | 2000 | 2100 | 2700 |
| Elongation at break % | 30 | 40 | 36 | 22 |
| Impact strength kJ/m² | 65 | 65 | 63 | 55 |
| Vicat temperature °C. | 88 | 90 | 80 | 90 |
| Melt index g/10 min | 9 | 6 | 22 | 13 |
| Class according to UL 94 | V-1 | V-0 | V-2 | V-2 |
| Intrinsic color | normal | normal | normal | normal |

The requisite fire class was achieved, and the products were pale and presented no difficulty in processing to give finished articles.

The products of comparative experiments 5, 6, 7 and 8 showed brown discoloration and were pervaded by blackish brown particles, so that it was not possible to measure meaningful product properties. When the product issued from the discharge dies of the extruder, a pungent odor of hydrogen halide was noted, in contrast to Examples 1 to 4.

We claim:

1. In a process for preparing flame-proofed polystyrene which contains halohydrocarbons as flame-proofing agents and which additionally contains additives from the group consisting of a synergist for the flameproofing agents, a stabilizer, an antioxidant, an additional additive, and mixtures thereof, the improvement which comprises:

1) in a mixing apparatus, preparing a premix comprising the flame-proofing agent and at least part of the stabilizer at a temperature up to 100° C.
2) in a continuously operated single-screw or twin-screw extruder combining the premix of step 1) with the remaining additives in such a manner that, viewed in the conveying direction of the extruder, the premix and the remaining additives are combined in a first mixing zone, to form a flame-proofing mix,
3) passing the flame-proofing mix into a discharge zone of the extruder,
4) performing in a polymerization apparatus a polystyrene polymerization process to prepare a polystyrene melt which is free of monomers and solvents and is at a temperature of 200° to 250° C.,
5) introducing the polystyrene of step 4) directly from the polymerization apparatus into the discharge zone of the extruder containing the flame-proofing mix, mixing the polystyrene and the flame-proof mix to form flame-proofed polystyrene,
6) discharging the flame-proofed polystyrene from the extruder, preparing granules of the flame-proofed polystyrene extrudate, and isolating the granules,
whereby flame-proofed polystyrene granules are prepared which are resistant to discoloration and decomposition.

2. The process of claim 1, wherein the synergist is $Sb_2O_3$ and the flame-proofing agent is a chloroparaffin.

3. In a process for preparing flame-proofed polystyrene which contains hexabromocyclododecane (HBCD) as the flame-proofing agent and which additionally contains additives from the group consisting of a stabilizer, an antioxidant, an additional additive, and mixtures thereof, the improvement comprising:

1) in a mixing apparatus, preparing a premix comprising HBCD and a stabilizer at a temperature up to 100° C.,
2) in a continuously operated single-screw or twin-screw extruder combining the premix of step 1) with the remaining additives in such a manner that, viewed in the conveying direction of the extruder, the premix and the remaining additives are combined in a first mixing zone, to form a flame-proofing mix,
3) introducing granulated polystyrene in a proportion of 3 to 50% by weight, based on the total weight of the flame-proof mix of step 2) and the polystyrene, into the first mixing zone of the extruder,
4) heating the first mixing zone to a temperature of 160° to 220° C. to melt the granulated polystyrene, to produce a mixture of polystyrene melt and flame-proofing mix,
5) passing the mixture produced in step 4) to a further mixing zone,
6) in a polymerization apparatus, performing a polystyrene polymerization process to prepare a polystyrene melt which is free of monomers and solvents and is at a temperature of 200° to 250° C.,
7) introducing the polystyrene melt of step 6) directly from the polymerization apparatus into the further mixing zone of step 4), mixing the polystyrene melts and the flame-proofing mix to produce a flame-proofed polystyrene melt,
8) discharging the flame-proofed polystyrene melt from the extruder,
9) granulating the discharged flame-proofed polystyrene, and isolating the granules,
whereby flame-proofed polystyrene granules are prepared which are resistant to discoloration and decomposition.

* * * * *